United States Patent
Hiyama et al.

(10) Patent No.: US 7,924,336 B2
(45) Date of Patent: *Apr. 12, 2011

(54) IMAGE PICKUP APPARATUS INCLUDING A DRIVING CIRCUIT TO CONTROL A CLAMPING SWITCH SO AS TO HOLD SIGNALS IN HOLDING CAPACITORS

(75) Inventors: Hiroki Hiyama, Kanagawa (JP); Katsuhito Sakurai, Tokyo (JP); Akira Okita, Kanagawa (JP); Hideaki Takada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,676

(22) Filed: Nov. 2, 2009

(65) Prior Publication Data

US 2010/0045839 A1    Feb. 25, 2010

Related U.S. Application Data

(62) Division of application No. 11/842,400, filed on Aug. 21, 2007, now Pat. No. 7,633,541, which is a division of application No. 10/808,444, filed on Mar. 25, 2004, now Pat. No. 7,382,409.

(30) Foreign Application Priority Data

Mar. 27, 2003    (JP) ................................. 2003-088475

(51) Int. Cl.
     *H04N 5/335*    (2006.01)
(52) U.S. Cl. ...................................................... 348/308
(58) Field of Classification Search .................... 348/308
See application file for complete search history.

(56) References Cited

U.S. PATENT DOCUMENTS

| 4,914,519 | A | | 4/1990 | Hashimoto et al. ........... 358/213 |
| 5,019,702 | A | | 5/1991 | Ohzu et al. ..................... 250/208 |
| 5,172,249 | A | | 12/1992 | Hashimoto .................... 358/482 |
| 5,311,320 | A | | 5/1994 | Hashimoto .................... 348/243 |
| 5,329,312 | A | | 7/1994 | Boisvert et al. ................ 348/256 |
| 5,331,421 | A | | 7/1994 | Ohzu et al. ..................... 340/262 |
| 5,434,619 | A | * | 7/1995 | Yonemoto ...................... 348/241 |
| 5,737,016 | A | | 4/1998 | Ohzu et al. ..................... 348/241 |
| 5,771,070 | A | | 6/1998 | Ohzu et al. ..................... 348/241 |

(Continued)

FOREIGN PATENT DOCUMENTS

JP      62-185471 A      8/1987

(Continued)

*Primary Examiner* — John M Villecco
*Assistant Examiner* — Kent Wang
(74) *Attorney, Agent, or Firm* — Fitzpatrick, Cella, Harper & Scinto

(57) ABSTRACT

An image pickup apparatus comprising: a plurality of pixels each including a photoelectric converting element; a plurality of capacitor which receive signals from the plurality of pixels at first terminals; a plurality of clamping switches for setting a second terminal of each of the plurality of capacitor into a predetermined electric potential; a plurality of first storing units for storing signals from the second terminals of the plurality of capacitor; a plurality of second storing units for storing the signals from the second terminals of the plurality of capacitor; a first common output line to which the signals from the plurality of first storing units are sequentially output; a second common output line to which the signals from the plurality of second storing units are sequentially output; and a difference circuit for operating a difference between the signal from the first common output line and the signal from the second common output line.

4 Claims, 5 Drawing Sheets

U.S. PATENT DOCUMENTS

| | | | |
|---|---|---|---|
| 6,498,332 B2 | 12/2002 | Funakoshi | 250/208.1 |
| 6,567,571 B1 | 5/2003 | Kochi et al. | 382/312 |
| 6,587,603 B1 | 7/2003 | Sakurai et al. | 382/312 |
| 6,633,334 B1 | 10/2003 | Sakurai et al. | 348/308 |
| 6,653,617 B2 | 11/2003 | Hiyama et al. | 250/214.1 |
| 6,734,908 B1 | 5/2004 | Watanabe et al. | 348/308 |
| 6,747,699 B2 | 6/2004 | Ohzu et al. | 348/294 |
| 6,757,016 B1 | 6/2004 | Ueno et al. | 348/279 |
| 6,801,255 B2 | 10/2004 | Inui | 348/241 |
| 6,831,685 B1 | 12/2004 | Ueno et al. | 348/243 |
| 6,839,084 B1 | 1/2005 | Hiyama et al. | 348/241 |
| 6,850,278 B1 | 2/2005 | Sakurai et al. | 348/302 |
| 6,963,372 B1 | 11/2005 | Hiyama et al. | 348/302 |
| 6,975,356 B1 | 12/2005 | Miyamoto | 348/308 |
| 6,999,119 B1 | 2/2006 | Shibazaki et al. | 348/273 |
| 7,129,985 B1 | 10/2006 | Koizumi et al. | 348/312 |
| 7,142,233 B1 | 11/2006 | Ogawa et al. | 348/272 |
| 7,382,409 B2 * | 6/2008 | Hiyama et al. | 348/308 |
| 2001/0030701 A1 | 10/2001 | Hiyama et al. | 348/304 |
| 2002/0051229 A1 | 5/2002 | Eguchi et al. | 358/445 |
| 2002/0054390 A1 | 5/2002 | Koizumi et al. | 358/513 |
| 2002/0190215 A1 | 12/2002 | Tashiro et al. | 250/370.1 |
| 2003/0058047 A1 | 3/2003 | Sakurai | 330/253 |
| 2003/0117510 A1 | 6/2003 | Sakurai et al. | 348/308 |

FOREIGN PATENT DOCUMENTS

| | | |
|---|---|---|
| JP | 4061573 | 2/1992 |
| JP | 6-237471 | 8/1994 |
| JP | 8-163311 | 6/1996 |
| JP | 10-200820 | 7/1998 |
| JP | 11-298911 | 10/1999 |
| JP | 2003-51989 A | 2/2003 |

* cited by examiner

US 7,924,336 B2

IMAGE PICKUP APPARATUS INCLUDING A DRIVING CIRCUIT TO CONTROL A CLAMPING SWITCH SO AS TO HOLD SIGNALS IN HOLDING CAPACITORS

RELATED APPLICATIONS

This application is a division of U.S. patent application Ser. No. 11/842,400, filed Aug. 21, 2007 (now U.S. Pat. No. 7,633,541, dated Dec. 15, 2009), which was a division of U.S. patent application Ser. No. 10/808,444, filed Mar. 25, 2004 (now U.S. Pat. No. 7,382,409, dated Jun. 3, 2008), both of which are incorporated by reference herein in their entirety, as if fully set forth herein, and claims the benefit of priority under 35 U.S.C. §119, based on Japanese Patent Application No. 2003-088475, filed Mar. 27, 2003, which is incorporated by reference herein in its entirety, as if fully set forth herein.

BACKGROUND OF THE INVENTION

1. Field of the Invention

The invention relates to an image pickup apparatus for picking up an object image.

2. Related Background Art

In recent years, attention has been paid to a solid-state image pickup element called a CMOS sensor using a CMOS process. The application of the CMOS sensor to, particularly, the field of portable information apparatuses has been progressed because of easy fabricating together with peripheral circuits, low-voltage driving, and the like. At the initial stage of research of the CMOS sensor, fixed pattern noises, which are generated due to a variation in element characteristics of each pixel were a large problem. As one of methods of effectively eliminating the fixed pattern noises, the following method using a clamping circuit has been proposed. FIG. 7 shows an equivalent circuit diagram of the solid-state image pickup element according to the prior art. FIG. 7 shows a portion regarding one certain pixel (it is assumed to be a pixel arranged at the nth row and the mth column here) among pixels which are two-dimensionally arranged. In FIG. 7, a unit pixel comprises: a photodiode 1 as a photoelectric converting element; an amplifying MOSFET (Metal Oxide Silicon Field Effect Transistor) 4 for amplifying a signal generated in the photodiode 1; a pixel reset switch 3 for resetting an input of the amplifying MOSFET 4 to a predetermined electric potential; and a row selecting switch 5 for controlling electric connection between a source electrode of the amplifying MOSFET 4 and a vertical output line 6. When the row selecting switch 5 is turned on, a source follower circuit in which a load MOSFET 7 is used as a load is formed and an electric potential reduced from an electric potential of the photodiode by an amount corresponding to a threshold value of the amplifying MOSFET 4 appears on the vertical output line 6 in accordance with the electric potential of the photodiode 1. A clamping capacitor 8 and a clamping switch 9 construct a clamping circuit. The clamping circuit shuts off a DC component of the vertical output line potential and transfers only a potential change amount based on a light charge amount to the post stage. A light response component obtained via the clamping circuit is temporarily held in a holding capacitor 12. Thereafter, it is read out to a horizontal output line 17 via a horizontal transfer gate 14 which is controlled by a horizontal scanning circuit 19. The horizontal output line 17 is connected to an input of an output amplifier 18. The output amplifier 18 drives an external load (not shown).

The operation of the solid-state image pickup element will now be described in detail by using driving pulse timing in FIG. 8. It is assumed that prior to the reading operation, a predetermined exposing time has elapsed and photo-charges have been accumulated in the photodiode 1. With respect to the nth row selected by a vertical scanning circuit (not shown), a row selecting pulse PSEL is set to the high level and a light output according to the light charge amount appears on the vertical output line 6. A subscript "n" added to each of notations "PSEL" and "PRES" in FIG. 8 indicates a pulse which is applied to the pixel of the nth row. Subsequently, a clamping pulse PCOR changes from the high level to the low level and the light output is clamped. At this time, an electric potential of the holding capacitor 12 has been reset to a clamping voltage VCOR. Subsequently, the pixel reset pulse PRES is held at the high level for a predetermined period of time and when the photodiode 1 is reset, a dark output appears on the vertical output line 6. At this time, a change amount from the light output to the dark output is transferred as a photosignal component to the holding capacitor 12 via the clamping capacitor 8. At this time, assuming that a capacitance of the clamping capacitor 8 is CO and a capacitance of the holding capacitor is CT, then a photosignal component is transferred with a gain of CO/(CO+CT). When a transfer pulse PTS changes from the high level to the low level, a circuit between the clamping capacitor 8 and the holding capacitor 12 is shut off and a light response component is held in the holding capacitor 12. Fixed pattern noises, which are generated due to a variation in threshold value of the amplifying MOSFET 4 of each pixel have been eliminated by the clamping circuit constructed by the clamping capacitor 8 and the clamping switch 9. After that, scanning pulses HSR(1) ... HSR(m) are generated by the horizontal scanning circuit 19, the horizontal transfer gate 14 is sequentially opened/closed, and the photosignal temporarily stored in the holding capacitor 12 is read out to the horizontal output line 17 (for example, Japanese Patent Application Laid-Open No. H04-61573).

However, the above-described solid-state image pickup element according to the prior art has the following problems. When the clamping switch 9 is turned off, since a part of inverting layer charges formed in the clamping switch 9 flows into the holding capacitor 12 side, the electric potential after the turn-off of the switch 9 drops to a level lower than the clamping voltage VCOR. Since a parasitic capacitance exists between a gate and a source (drain) of the clamping switch 9, the clamping pulse PCOR is mixed into the holding capacitor 12 side via the parasitic capacitance. If an amount of inverting layer charges and the parasitic capacitance are different for every clamping switch, a difference between offset voltages occurs and the fixed pattern noises are generated in the horizontal direction. Generally, there is a tendency that the farther a distance between two different switches is, the larger the difference between the offset voltages is, and a phenomenon that an output level changes gradually in the horizontal direction occurs. Such a phenomenon results in a luminance fluctuation of a display screen. In the case of a color sensor, a spatial deviation of a white balance is further caused. Since the offset voltage fluctuates at random due to an event that the clamping switch is turned off, it becomes a factor of generation of random noises. By taking into consideration of a fact that a transfer gate 10 is ON when the clamping switch 9 is turned off, an amount of such random noises is expressed by $$\sqrt{(kT/(CO+CT))}$$

where, k: Boltzmann's constant
T: absolute temperature

Particularly, the higher definition an image sensor has, the less the values of CO and CT become in association with a decrease in pixel pitch. Therefore, there is a tendency of an increase in random noises. As mentioned above, offset components which are generated in the clamping switch 9 become the fixed pattern noises and random noises to deteriorate picture quality, and become an obstacle to realization of high picture quality by the solid-state image pickup element and its driving method of the prior art.

SUMMARY OF THE INVENTION

It is an object of the invention to improve picture quality.

To accomplish the above object, according to an aspect of the present invention, an image pickup apparatus of the present invention comprises: a plurality of pixels each including a photoelectric converting element; a plurality of capacitor which receive signals from the plurality of pixels at first terminals; a plurality of clamping switches for setting a second terminal of each of the plurality of capacitor into a predetermined electric potential; a plurality of first storing means for storing signals from the second terminals of the plurality of capacitor; a plurality of second storing means for storing the signals from the second terminals of the plurality of capacitor; a first common output line to which the signals from the plurality of first storing means are sequentially output; a second common output line to which the signals from the plurality of second storing means are sequentially output; and difference means for operating a difference between the signal from the first common output line and the signal from the second common output line.

The above and other objects and features of the present invention will become apparent from the following detailed description and the appended claims with reference to the accompanying drawings.

DESCRIPTION OF THE PREFERRED EMBODIMENTS

First Embodiment

Figure 1:
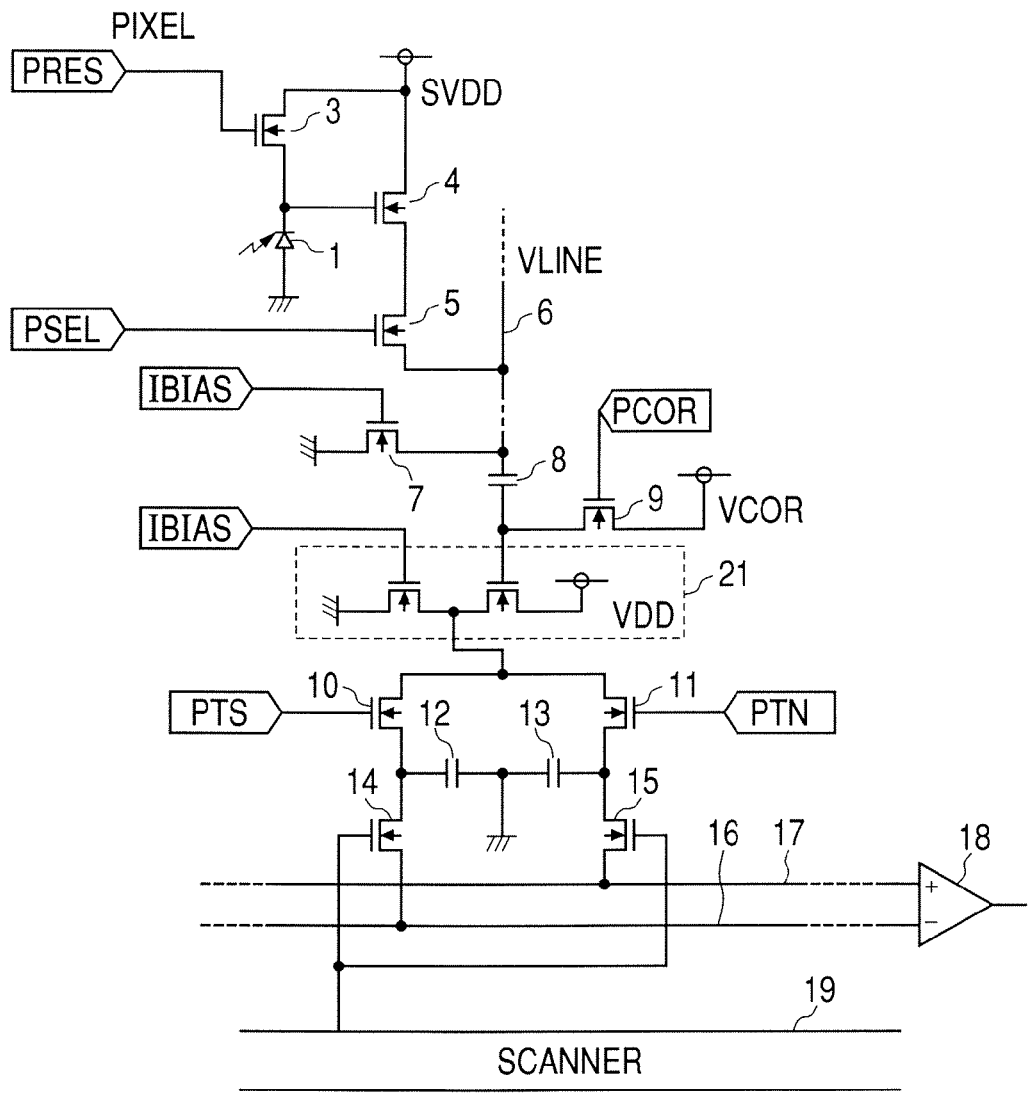
FIG. 1 is an equivalent circuit diagram of a solid-state image pickup element according to the first embodiment of the invention.

A solid-state image pickup element according to the first embodiment of the invention and its driving method will now be described. FIG. 1 is an equivalent circuit diagram of the solid-state image pickup element according to the first embodiment and shows a portion regarding one certain pixel (it is assumed to be a pixel arranged at the nth row and the mth column here) among pixels which are two-dimensionally arranged. In FIG. 1, a unit pixel comprises: the photodiode 1 as a photoelectric converting element; the amplifying MOSFET 4 as first amplifying means for amplifying the signal generated in the photodiode 1; the reset switch 3 for resetting the input of the amplifying MOSFET 4 to a predetermined voltage; and the row selecting switch 5 for controlling the electric connection between the source electrode of the amplifying MOSFET 4 and the vertical output line 6. When the row selecting switch 5 is turned on, a source follower circuit in which the load MOSFET 7 is used as a load is formed and an electric potential reduced from an electric potential of the photodiode by an amount corresponding to the threshold value of the amplifying MOSFET 4 appears on the vertical output line 6 in accordance with the electric potential of the photodiode 1. The clamping capacitor 8 as a capacitor and the clamping switch 9 construct together the clamping circuit. The clamping circuit shuts off a DC component of the vertical output line potential and transfers a potential change amount of the vertical output line to the post stage. The transfer gate 10 and the holding capacitor 12 serving as first storing means and a transfer gate 11 and a holding capacitor 13 serving as second storing means are provided symmetrically. The first storing means holds a signal corresponding to a dark output. The second storing means holds a signal corresponding to a light output. A source follower circuit 21 is provided for charging or discharging each of the holding capacitors 12 and 13 in accordance with the electric potential of the electrode on the output side of the clamping capacitor 8, respectively. The holding capacitors 12 and 13 are connected to a horizontal output line 16 as a first common output line and the horizontal output line 17 as a second common output line via horizontal transfer gates 14 and 15, respectively. A difference between outputs of the horizontal output lines 16 and 17 is operated by the output amplifier 18 as difference means.

Figure 2:
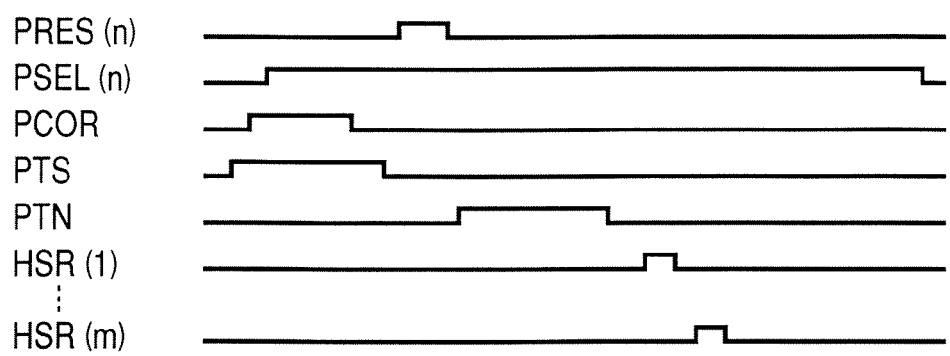
FIG. 2 is a timing chart of driving pulses of the solid-state image pickup element of the first embodiment of the invention.

The operation of the solid-state image pickup element will now be described in detail by using driving pulse timing in FIG. 2. It is assumed that prior to the reading operation, a predetermined exposing time has elapsed and photo-charges have been accumulated in the photodiode 1. With respect to the nth row selected by the vertical scanning circuit (not shown), the row selecting pulse PSEL is set to the high level and the light output according to the light charge amount appears on the vertical output line 6. The subscript "n" added to each of notations "PSEL" and "PRES" in FIG. 2 indicates the pulse which is applied to the pixel of the nth row. Subsequently, the clamping pulse PCOR changes from the high level to the low level and the light output is clamped. The output side electrode potential VCOR of the clamping capacitor 8 corresponding to the light output as a first signal is transferred to the holding capacitor 12 by the source follower circuit 21 as second amplifying means and sampled when the transfer pulse PTS is set to the low level. At this time, the offset voltage, which is generated when the clamping switch 9 is turned off is held in the holding capacitor 12. Subsequently, the pixel reset pulse PRES is held at the high level for a predetermined period of time, the photodiode 1 is reset, and the dark output appears on the vertical output line 6. A second signal corresponding to a potential change from the light output to the dark output, that is, the signal obtained by subtracting the dark output from the light output is sent to the other holding capacitor 13 via the clamping capacitor 8 and the source follower circuit 21 and sampled at a moment when the transfer pulse PTN is set to the low level. At this time, the offset voltage, which is generated when the clamping switch 9 is turned off is multiplexed to the light response component and held in the holding capacitor 13. By operating a difference between the signals held in the two holding capacitors 12 and 13 by the output amplifier 18 at the post stage, the offset voltages which are generated in the clamping switch 9 and the source follower circuit 21 is removed and only the light response component can be obtained. Since the offset voltages held in the two holding capacitors 12 and 13 have been sampled in the same low-level period with respect to the clamping pulse PCOR, they are the offset voltages generated in the same event as a resetting operation by the clamping switch 9. Therefore, the random noise components can be also removed. As described above, according to the solid-state image pickup element of the first embodiment of the invention and its driving method, the fixed pattern noises which are generated due to a variation in the amplifying MOSFET 4 of the pixel can be eliminated by the clamping circuits 8 and 9, the fixed pattern noises and the random noises which are generated in the clamping switch 9 can be eliminated by the output amplifier, and the image signal of low noises and high quality can be obtained.

Second Embodiment

Figure 3:
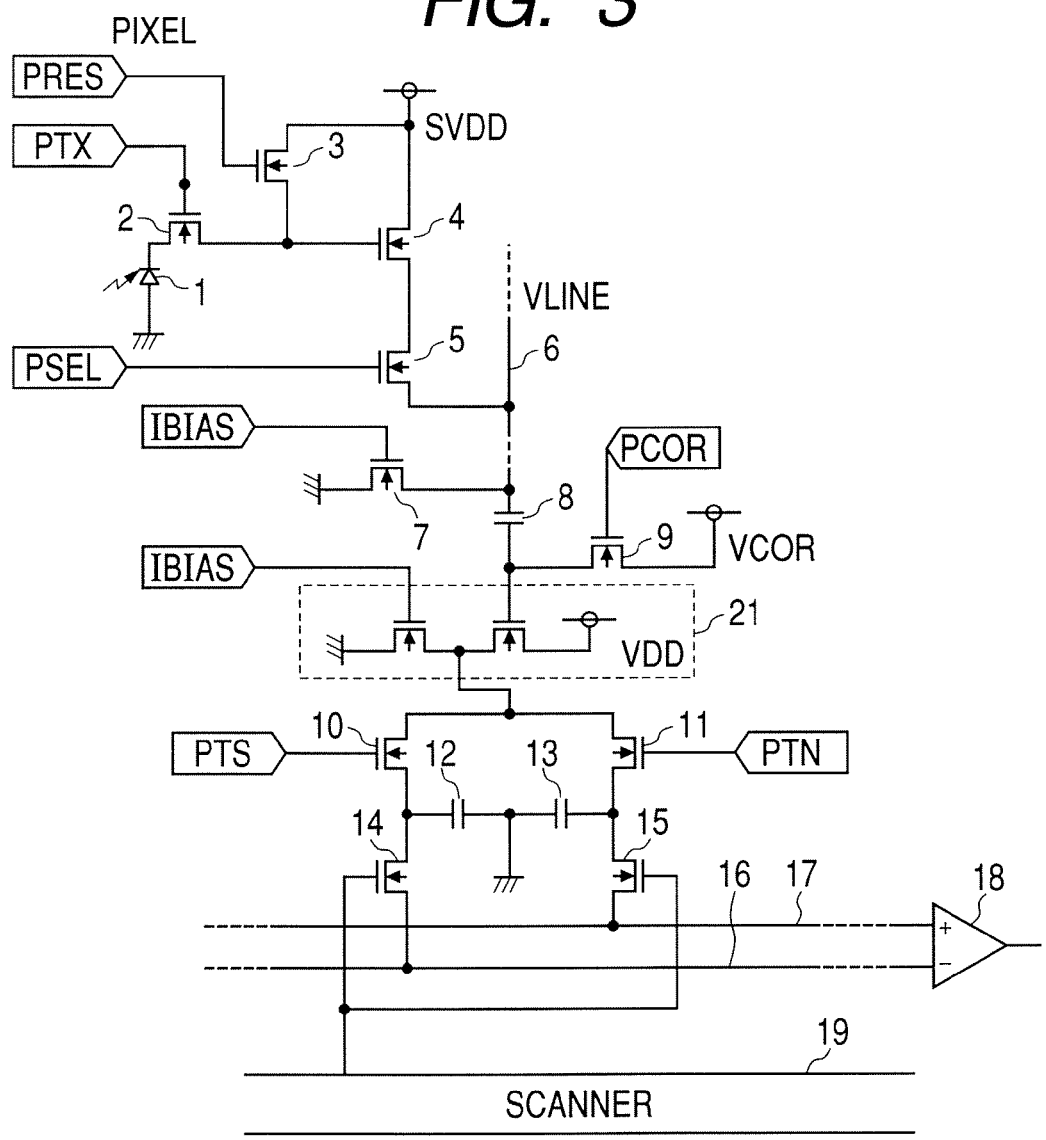
FIG. 3 is an equivalent circuit diagram of a solid-state image pickup element according to the second embodiment of the invention.

A solid-state image pickup element according to the second embodiment of the invention and its driving method will be described. FIG. 3 is an equivalent circuit diagram of the solid-state image pickup element according to the second embodiment and shows a portion regarding one certain pixel (it is assumed to be a pixel arranged at the nth row and the mth column here) among pixels which are two-dimensionally arranged. In a manner similar to the first embodiment, in FIG. 3, a unit pixel comprises: the photodiode 1 as a photoelectric converting element; the amplifying MOSFET 4 as first amplifying means for amplifying the signal generated in the photodiode 1; the reset switch 3 for resetting the input of the amplifying MOSFET 4 to a predetermined voltage; and the row selecting switch 5 for controlling the electric connection between the source electrode of the amplifying MOSFET 4 and the vertical output line 6. Further, a pixel transfer gate 2 for controlling the electric connection between the photodiode 1 and a gate electrode of the amplifying MOSFET 4 is provided.

Figure 4:
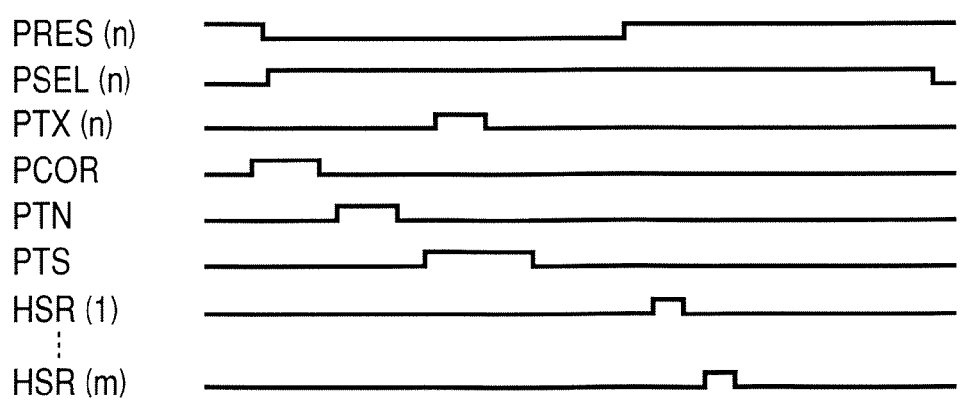
FIG. 4 is a timing chart of driving pulses of the solid-state image pickup element of the second embodiment of the invention.

The operation of the solid-state image pickup element will now be described in detail by using driving pulse timing in FIG. 4. It is assumed that prior to the reading operation, a predetermined exposing time has elapsed and photo-charges have been accumulated in the photodiode 1. With respect to the nth row selected by the vertical scanning circuit (not shown), first, the pixel reset pulse PRES is changed from the high level to the low level and the resetting of the gate electrode of the amplifying MOSFET 4 is cancelled. At this time, a voltage corresponding to the dark state is held in a parasitic capacitor (hereinafter, referred to as a CFD) of the pixel including the gate electrode. If the voltage at which the gate voltage is reset lies within a pentode region when the pixel reset switch 3 is ON, it becomes the voltage dropped from the gate high level of the pixel reset switch 3 by an amount corresponding to the threshold value. If the voltage lies within a triode region, although it becomes an SVDD voltage, it decreases to a value that is slightly lower than those voltages, when pixel reset switch is turned off. Such a voltage drop is caused by the inflow of inverting layer charges which are formed in the ON state of the pixel reset switch or by field through via the parasitic capacitance between the gate and source of the pixel reset switch 3. Subsequently, the row selecting pulse PSEL is set to the high level and the dark output appears on the vertical output line 6. After the elapse of a predetermined time, the clamping pulse PCOR changes from the high level to the low level and the dark output is clamped. In a form in which the offset voltage which is generated when the clamping switch is turned off has been multiplexed, the output side electrode potential VCOR of the clamping capacitor 8 corresponding to the dark output, which is a second signal, is sampled into the holding capacitor 12 at a moment when the transfer pulse PTN is set to the low level.

Subsequently, in the pixel, the pixel transfer gate 2 is set to the high level for a predetermined period of time and the light charges accumulated in the photodiode 1 are transferred to the gate electrode of the amplifying MOSFET 4. Thus, the gate potential drops from the voltage in the dark state by an amount of Q/CFD when the transferred charges are assumed to be Q. The light output appears on the vertical output line 6 in correspondence to such a voltage drop. The second signal corresponding to potential change from the dark output to the light output, that is, the signal obtained by subtracting the dark output from the light output is sent to the holding capacitor 13 via the clamping capacitor 8 and the source follower circuit 21 and sampled at a moment when the PTS is set to the low level as a signal including the offset voltage which is generated when the clamping switch is turned off. In a manner similar to the first embodiment, the light response component is obtained by operating the difference between the signals held in the holding capacitors 12 and 13. At this time, not only the offset voltage which is generated in the clamping switch 9 but also the offset voltage which is generated in the pixel reset switch 3 is removed by the difference operation. The two signals which are subjected to the difference operation are sampled in the same low-level period of the clamping pulse PCOR and the pixel reset pulse PRES and the resetting operations of the clamping switch 9 and the pixel reset switch 3 are the same event. Therefore, the random noise components are also eliminated. Thus, according to the solid-state image pickup element of the second embodiment of the invention and its driving method, the fixed pattern noises which are generated due to a variation in the amplifying MOSFET 4 of the pixel can be eliminated by the clamping circuits 8 and 9, the fixed pattern noises and the random noises which are generated in the pixel reset switch 3 and the clamping switch 9 can be simultaneously eliminated by the output amplifier 18, and the image signal of low noises and high quality can be obtained.

Third Embodiment

Figure 5:
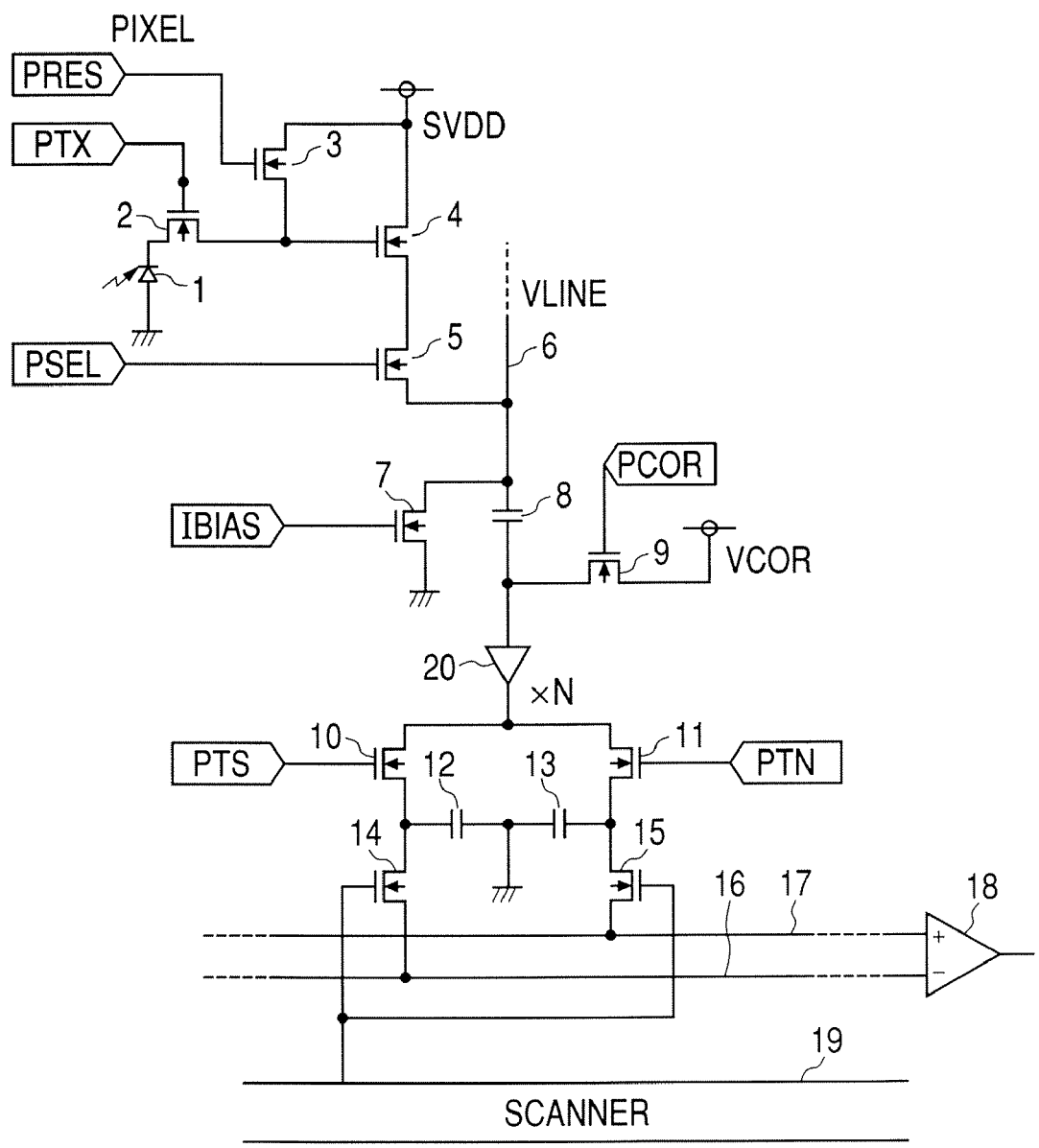
FIG. 5 is an equivalent circuit diagram of a solid-state image pickup element according to the third embodiment of the invention.

A solid-state image pickup element according to the third embodiment of the invention and its driving method will be described. FIG. 5 is an equivalent circuit diagram of the solid-state image pickup element according to the third embodiment and shows a portion regarding one certain pixel (it is assumed to be a pixel arranged at the nth row and the mth column here) among pixels which are two-dimensionally arranged. The equivalent circuit is similar to that of FIG. 3 except for that a gain amplifier 20 is provided in place of the source follower circuit 21 in the solid-state image pickup element according to the second embodiment of FIG. 3. Generally, the output amplifier 18 needs to be an amplifier of a wide band in order to trace the horizontal transfer operation according to the horizontal scanning circuit 19. When the incident light is weak, it is necessary to amplify a voltage of the light response signal at some place in order to output the sufficient light response signal to the outside. However, if a high voltage amplification factor is set by the output amplifier 18 of the wide band, noise characteristics deteriorate remarkably. It is, therefore, desirable to amplify the voltage in the processing step of reading out the pixel to the holding capacitors 12 and 13 in which no problem occurs even in a narrow band.

Particularly, when the apparatus is used in a digital still camera or the like, it is preferable to switch the voltage amplification factor of the gain amplifier 20 in association with a set ISO sensitivity. Consequently, in the high ISO sensitivity setting which presumes an object of weak incident light, the noise characteristics can be remarkably improved. Ordinarily, since the ISO sensitivity is often set as a ratio of the power of 2 such as 100, 200, 400, . . . , or the like, it is further desirable to set the voltage amplification factor so as to include those ratios. One of technological advantages which are obtained by providing the gain amplifier 20 to a position just after the clamping circuit, is that the input level of the gain amplifier 20 can be easily adjusted by the clamping voltage VCOR. Although the offset voltages which are generated in the pixel reset switch 3 and the clamping switch 9 are amplified by the gain amplifier 20, they can be eliminated by using the driving pulse timing in FIG. 4 by a method similar to that described in the second embodiment. The offset voltage which the gain amplifier 20 itself has is also simultaneously eliminated. Further, random noises of a period longer than the sampling interval of each of the PTN and the PTS, for example, 1/f noises of a long period can be also eliminated. According to the solid-state image pickup element of the third embodiment of the invention, the fixed pattern noises and the random noises, which are generated in the pixel reset switch 3 and the clamping switch 9 can be also simultaneously eliminated. Further, the offset voltage of the gain amplifier 20 and the random noises of the long period can be eliminated. Since the fixed pattern noises and the random noises which are generated in the pixel reset switch 3 and the clamping switch 9 can be eliminated even after the voltages are amplified by the gain amplifier 20, the effect of reduction of the random noises due to the voltage amplification executed in the circuit portion of a narrow band can be obtained without causing side effects. Owing to those effects, the image signal of low noises and high quality can be obtained.

The first to third embodiments described above further have technological effects as will be explained hereinbelow.

A rejection ratio of the noise components in the clamping circuit is better than that of the noise components (by one digit) in the system in which the light output to the dark output are held in the two holding capacitors and the difference between them is operated. It is necessary to execute the horizontal scan at a high speed.

If the clamping circuit is provided at the final stage, the dark output and the light output have to be alternately output to the clamping circuit and it is difficult to execute the horizontal scan at a high speed. In the first to third embodiments, the clamping circuit is provided every vertical output line and the noises which are generated in the clamping circuit are suppressed by the amplifier at the final stage, so that the solid-state image pickup element in which the suppression of the noises and the realization of the high reading speed are harmonized can be provided.

The fixed pattern noises and the random noises, which are generated due to the variation in the amplifying MOSFET 4 of each pixel can be almost completely suppressed by the clamping circuit. An absolute amount of the noises, which are generated in the clamping circuit and an absolute amount of the source follower can be also reduced by the output amplifier at the final stage. The noise components which cannot be eliminated almost completely in the solid-state image pickup element become one-dimensional noises which are caused by the clamping circuit and the source follower. A memory which stores one-dimensional data is provided at the post stage of the image pickup element, one-dimensional correction data is stored into this memory, and the one-dimensional noise components are corrected by the one-dimensional correction data. According to the correcting method as mentioned above, it is sufficient to use the memory for storing the one-dimensional data and it contributes to the decrease in memory and the decrease in load at the post stage.

An obtaining method of the one-dimensional correction data will now be described.

The following operation is executed when a power source of an image pickup apparatus (digital camera) in which the image pickup element has been mounted is turned on.

Signals of a part of the pixels (pixels of a few lines) in the image pickup element are read out via the clamping circuit and the source follower in a state where a mechanical shutter is closed and the light is shielded. By averaging the read-out signals (averaging the signals of the pixels in the vertical direction), the one-dimensional correction data is formed and stored into the memory.

Fourth Embodiment

The image pickup apparatus using the solid-state image pickup element explained in the first to third embodiments mentioned above will now be described with reference to FIG. 6.

Figure 6:
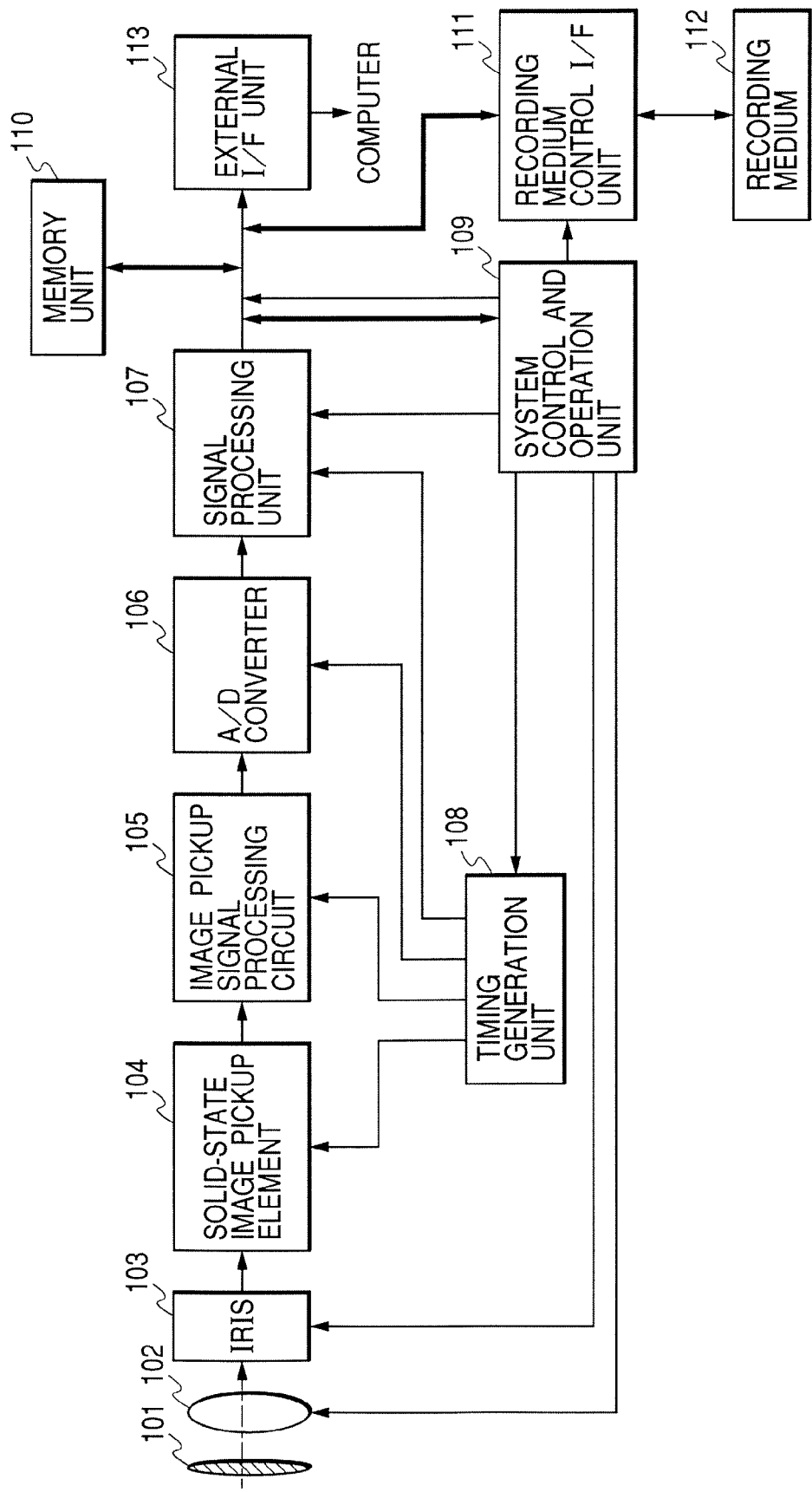
FIG. 6 is a diagram showing an image pickup apparatus according to the fourth embodiment of the invention.
Figure 7:
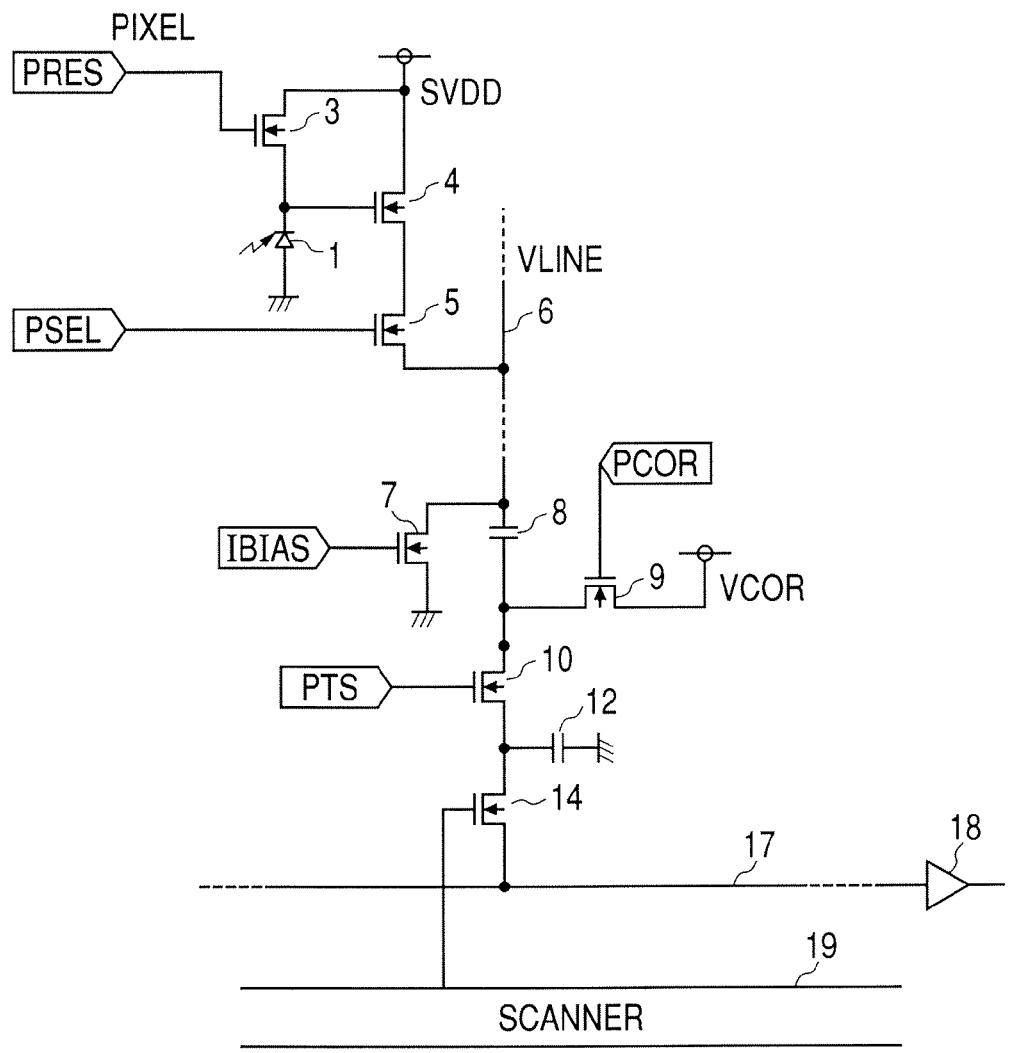
FIG. 7 is an equivalent circuit diagram of a solid-state image pickup element according to the prior art.
Figure 8:
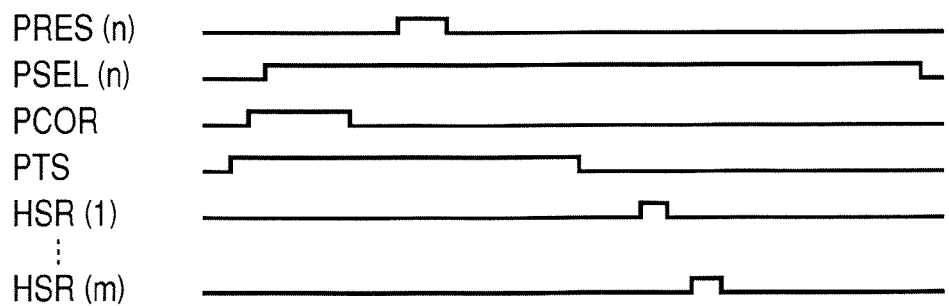
FIG. 8 is a timing chart of driving pulses of the solid-state image pickup element of the prior art.

In FIG. 6, reference numeral 101 denotes a barrier serving as a lens protecting member and a main switch; 102 a lens for forming an optical image of an object onto a solid-state image pickup element 104; 103 an iris for varying an amount of light which passed through the lens 102; 104 the solid-state image pickup element for fetching the object image formed by the lens 2 as an image signal; 105 an image pickup signal processing circuit including a variable gain amplifying unit for amplifying the image signal which is output from the solid-state image pickup element 104, a gain correcting circuit unit for correcting a gain value, and the like; 106 an A/D converter for converting the analog image signal output from the solid-state image pickup element 104 into a digital signal; 107 a signal processing unit for making various correction to the image data output from the A/D converter 106 and compressing the data; 108 a timing generation unit for generating various timing signals to the solid-state image pickup element 104, image pickup signal processing circuit 105, A/D converter 106, and signal processing unit 107, respectively; 109 a system control and operation unit for executing various arithmetic operations and controlling the whole image pickup apparatus; 110 a memory unit for temporarily storing the image data; 111 an interface unit (I/F unit) for recording or reading out the data into/from a recording medium; 112 a detachable recording medium such as a semiconductor memory or the like for recording or reading out the image data; and 113 an interface unit for communicating with an external computer or the like.

The signal processing unit 107 has a memory for storing the one-dimensional correction data to correct the noise components which are generated by the clamping circuits 8 and 9 and the noise components which are generated by the source follower circuit 21 described in the first to third embodiments. The signal output from the A/D converter is corrected on the basis of the correction data stored in the memory.

The signals from a plurality of pixels, which are output via the same vertical output line are corrected by using the same correction data. The one-dimensional correction data is the data including a noise component variation which is caused by the clamping circuits 8 and 9 arranged one-dimensionally and a variation which is caused by the difference between the offset components of the source follower circuit 21 arranged one-dimensionally.

As a method of obtaining the one-dimensional data, there is a method whereby a vertical OB portion (for example, the pixels of one line are shielded against the light) is provided for the solid-state image pickup element, the operations as described in the foregoing first to third embodiments are executed by using the pixels in the vertical OB portion, and a one-dimensional signal which is obtained from the output amplifier 18 is used as correction data.

The operation of the image pickup apparatus upon photographing in the above construction will now be described.

When the barrier 101 is opened, a main power source is turned on. Subsequently, a power source of a control system is turned on and, further, power sources of photographing system circuits such as an A/D converter 106 and the like are turned on.

After that, the system control and operation unit 109 opens the iris 103 in order to control an exposure amount and the signal output from the solid-state image pickup element 104 is converted by the A/D converter 106 and, thereafter, input into the signal processing unit 107.

An exposure is calculated by the system control and operation unit 109 on the basis of the data in the signal processing unit 107.

Brightness is discriminated on the basis of a result of the photometric process. The system control and operation unit 109 controls the iris in accordance with a discrimination result.

Subsequently, high frequency components are extracted and a distance to the object is operated by the system control and operation unit 109 on the basis of the signal output from the solid-state image pickup element 104. After that, the lens is actuated and whether an in-focus state is obtained or not is discriminated. If it is determined that the in-focus state is not obtained, the lens is actuated again and the distance measuring process is executed.

After the in-focus state is confirmed, the exposure is started.

After completion of the exposure, the image signal output from the solid-state image pickup element 104 is A/D converted by the A/D converter 106. The converted signal passes the signal processing unit 107 and is written into the memory unit by the system control and operation unit 109.

After that, the data stored in the memory unit 110 passes through the recording medium control I/F unit and is recorded into the detachable recording medium 112 such as a semiconductor memory or the like by the control of the system control and operation unit 109.

It is also possible that the image data is transmitted through the external I/F unit 113 and directly input to a computer or the like where the image is modified.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   a plurality of pixels arranged in a matrix, each including a photoelectric converting element;
   a plurality of capacitors each for storing signals from said plurality of pixels within a column of the matrix at first terminals;
   a plurality of clamping switches each for setting a second terminal of each of said plurality of capacitors to a predetermined electric potential;
   a plurality of gain amplifiers each with a variable amplification factor and each for amplifying the signals stored in a corresponding one of the plurality of capacitors;
   a plurality of first storing units each for storing signals from said second terminals of said plurality of capacitors via a corresponding one of the plurality of gain amplifiers;
   a plurality of second storing units each for storing the signals from said second terminals of said plurality of capacitors via the corresponding one of the plurality of gain amplifiers;
   a first common output line to which the signals from said plurality of first storing units are sequentially output;
   a second common output line to which the signals from said plurality of second storing units are sequentially output; and
   a difference circuit for operating a difference between the signal from said first common output line and the signal from said second common output line, wherein
   each of said first storing units includes a first transfer gate and a first holding capacitor for holding the transferred signal, and each of said second storing units includes a second transfer gate and a second holding capacitor for holding the transferred signal, and wherein
   said image pickup apparatus further comprises a driving circuit arranged so that after said clamping switch is turned off at a first timing, said clamping switch is continuously held in an OFF state and said first transfer gate is turned off at a second timing, thereby holding a first signal which is obtained from said second terminal of said capacitor into said first holding capacitor via the corresponding gain amplifier, and after said clamping switch is turned off at the first timing, said clamping switch is continuously held in the OFF state and said second transfer gate is turned off at a third timing, thereby holding a second signal which is obtained from said second terminal of said capacitor into said second holding capacitor via the corresponding gain amplifier.

2. The apparatus according to claim 1, wherein the variable amplification factor of the gain amplifier is changed in association with a sensitivity of the image pickup apparatus.

3. The apparatus according to claim 1, wherein said driving circuit effects driving so that the second terminal of said capacitor is set into said predetermined electric potential by turning on said clamping switch, the signal which is obtained from said first amplifying element by resetting the input portion of said first amplifying element is transferred to the first terminal of said capacitor, said clamping switch is turned off and thereafter said first signal which is obtained from the second terminal of said capacitor is held in said first storing unit, after that, a signal, which is output from said first amplifying element, including the photoelectric conversion signal from said photoelectric converting element is transferred to the first terminal of said capacitor, and said second signal which is obtained from the second terminal of said capacitor is held in said second storing unit.

4. The apparatus according to claim 1, wherein said driving circuit effects driving so that the second terminal of said capacitor is set into said predetermined electric potential by turning on said clamping switch, then a signal, which is output from said second amplifying element, including the photoelectric conversion signal from said photoelectric converting element is transferred to the second terminal of said capacitor, said clamping switch is turned off and thereafter said first signal which is obtained from the second terminal of said capacitor is held in said first storing unit, the signal which is obtained from said second amplifying element by resetting the input portion of said second amplifying element is transferred to the first terminal of said capacitor, and said second signal which is obtained from the second terminal of said capacitor is held in said second storing unit.

* * * * *